United States Patent [19]
Pross

[11] 3,974,512
[45] Aug. 10, 1976

[54] ELECTRONIC CONTROL DEVICE FOR PHOTOGRAPHIC EXPOSURE FACTORS

[75] Inventor: Wilhelm Pross, Munich, Germany

[73] Assignee: Compur-Werk Gesellschaft mit beschrankter Haftung & Co., Munich, Germany

[22] Filed: Oct. 14, 1975

[21] Appl. No.: 621,827

[30] Foreign Application Priority Data
Oct. 15, 1974 Germany.....................2449111

[52] U.S. Cl.................................. 354/226; 354/24; 354/51; 354/60 R; 354/235; 354/289
[51] Int. Cl.²........................................... G03B 9/58
[58] Field of Search................ 354/23 R, 24, 29, 38, 354/43, 50, 51, 60 R, 234, 235, 266, 267, 289, 226

[56] References Cited
UNITED STATES PATENTS
3,896,455  7/1975  Steinbatz................................ 354/24
FOREIGN PATENTS OR APPLICATIONS
2,064,078  7/1972  Germany............................... 354/24

*Primary Examiner*—Joseph F. Peters, Jr.
*Attorney, Agent, or Firm*—Stonebraker, Shepard & Stephens

[57] ABSTRACT

A control device for an exposure factor of a photographic camera, such as the factor of shutter time or speed. A settable scale, settable to various values to control the exposure factor, is graduated logarithmically, and movement of the scale causes relative movement between a wiper or slider and a resistance serving as a potentiometer, the resistance of the potentiometer varying in a linear manner rather than logarithmically. The output of the potentiometer is connected to the input of a logarithmizer, the output of which is connected to a control element for controlling the exposure factor, the control being through an operational amplifier serving as an integrator, and through a threshold switch. An RC member associated with the amplifier is short circuited when the shutter is in its rest or closed position, the short circuit being interrupted at the beginning of the opening movement of the shutter. The movement of the shutter release to start the shutter exposure cycle serves to connect the apparatus to the source of current.

5 Claims, 2 Drawing Figures

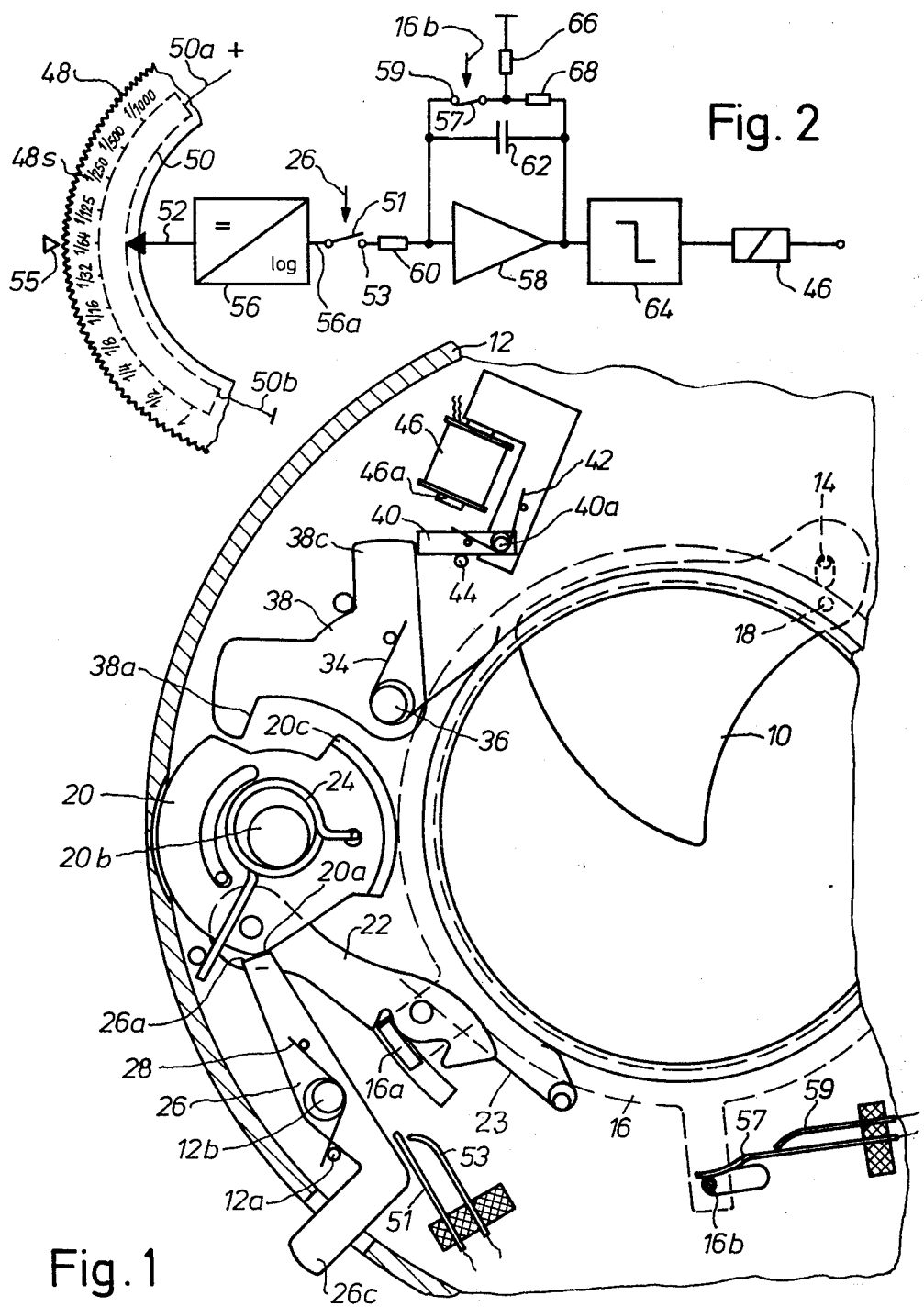

ELECTRONIC CONTROL DEVICE FOR PHOTOGRAPHIC EXPOSURE FACTORS

BACKGROUND OF THE INVENTION

This invention relates to an electronic control device for exposure factors in photography, such as the shutter speed (time or duration of the exposure) or the size of the diaphragm aperture. Merely as an illustrative example, the invention is illustrated as applied to a shutter of the "central" or "between-the-lens" type, but it is equally applicable to shutters of the focal plane or "curtain" type, and applicable to mechanism for controlling the size of the diaphragm aperture rather than the speed or timing of the shutter.

As well understood in the art, the shutter speed scale of a conventional photographic camera is customarily graduated logarithmically, each successive graduation representing a successive power of a base number. Usually, for example, each graduation represents twice or approximately twice the value of the next preceding graduation. The same relationship is often true in the graduated scale of the diaphragm aperture.

Electronic control of photographic shutters, both with respect to shutter speed (that is, time or duration of exposure) and with respect to diaphragm aperture, is well known in the art. Accurate control is difficult, however, in those arrangements where the electronic circuit contains a resistance which is varied by adjustment of the scale, because the scale is logarithmic while the resistance usually has linear characteristics; that is, a given movement along the scale represents a logarithmic change in value, whereas a corresponding given movement of the control member of the electrical resistance represents a linear change rather than a logarithmic change in value of the electrical resistance.

Various arrangements have been suggested for overcoming this discrepancy between the linear and logarithmic characteristics. In certain known setting means of this type, the logarithmic graduation of the values of the factors or settings is frequently obtained by means of a series of resistors, the individual resistances of which are graduated logarithmically with respect to each other. One difficulty is that this arrangement takes up a good deal of space, and in addition, this arrangement fails to permit an infinitely variable adjustment of the values.

It has also been attempted to control the situation by providing a logarithmically dimensioned variable resistor or potentiometer. The manufacture of such a logarithmic potentiometer is, however, very expensive, and the desired accuracy and setting cannot be assured over a wide control range which covers, for instance, several powers of ten.

SUMMARY OF THE INVENTION

The object of the present invention is to eliminate these disadvantages of the known arrangements, and to provide a setting device having simple components which can be manufactured at low cost, and which assures an exact setting within a control range is as wide as desired. This is achieved, according to the present invention, by using a linearly graduated resistor associated with the logarithmically graduated setting scale, and providing a logarithmizer having an input controlled from the resistor and an output connected with the electronic control device.

A preferred use of the invention is in the control of a timing device of a photographic shutter. For such a use, the output of the logarithmizer preferably leads to an operational amplifier connected as an integrator, with which there is associated an RC member which is placed in operation at the start of the opening movement of a shutter element. Preferably a threshold switch is present at the output of the integrator. At a time after the start of the opening movement of the shutter element (this time being determined by the RC member and its input voltage) the threshold switch places in operation a relay or the like, which brings about the closing movement of the shutter element.

In accordance with another feature of the invention, it is advantageous in a shutter of this type to use, between the logarithmizer and the integrator, a connecting switch for the control device, which switch is closed by a shutter release member or trigger member. In this connection it is further advisable to provide a short circuit switch which is associated with the RC member and which is opened by the initial movement of the shutter element.

One illustrative embodiment of the subject matter of the invention is described in further detail below, in conjunction with the drawings.

BRIEF DESCRIPTION OF THE DRAWINGS

FIG. 1 is a fragmentary view of a photographic shutter in accordance with a preferred embodiment of the invention, the movable parts of the shutter being shown in cocked or tensioned position, ready for making an exposure, the shutter blades being closed; and FIG. 2 is a schematic block diagram of the electronic timing device of the shutter.

DESCRIPTION OF THE PREFERRED EMBODIMENT

The illustrative embodiment of the invention is a shutter of the objective type, often referred to as a central shutter or a between-the-lens shutter. Such shutters are well known in the art. Except for the electrical and electronic control as described more fully below, the shutter may be conventional, and the exact details are not important for purposes of the present invention, and may be varied widely within the skill of the art.

For example, the shutter has conventional pivoted shutter blades 10 of any desired number (usually about five blades being used) but only one blade is shown for purposes of illustration. These blades are mounted within the usual conventional shutter housing or casing 12, each blade being supported on a pivot 14 in the shutter housing. The blades are driven in their respective opening and closing directions by a conventional blade ring 16 rotatable about the optical axis of the shutter as a center. The blade ring carries the drive pins 18, one for each blade. When the blade ring turns in one direction (counterclockwise in FIG. 1) the blades are opened, and when it turns in the opposite direction, the blades are closed again.

For operating the blade ring first in one direction and then in the other direction, there is provided a main drive member 20, commonly referred to as a "master member," and powered by a main drive spring or master spring 24 which tends to turn the master member in a clockwise direction. A coupler or link 22, pivoted at one end to the master member 20, cooperates at its other end, in conventional manner, with a lug 16a on a radial arm of the blade ring 16. In a manner well understood in the art, one shoulder or abutment surface on the link 22 engages the ear or lug 16a as the master member 20 turns counterclockwise from the position illustrated in FIG. 1, and shoves this ear 16a to turn the blade ring 16 in a counterclockwise direction to open the shutter blades 10. Then as the master member continues its counterclockwise rotation, a second abutment shoulder on the link 22 engages the opposite edge of the lug 16a and pulls this lug back to turn the blade ring in a clockwise direction to close the shutter blades 10. The free end of the coupling link 22 is held against the inner surface of the lug 16a by a light spring 23.

For the cocking or tensioning of the master member 20, there is provided a shaft 20b which extends out through the rear wall of the shutter housing 12, and is connected to any suitable mechanism for tensioning the master member. Conventionally it is connected to the film feeding mechanism of the camera, so that the master member is rotated clockwise from its run down position to its tensioned or cocked position, each time that the film is fed forwardly in the camera. In the tensioned position, the master member 20 is held or latched by a double armed release member 26 supported on a bearing pin 12b in the housing and having one end surface 26a which engages a latching surface 20a on the master member. The other arm 26c of the release member 26 projects to an accessible position outside the shutter housing. A spring 28 tends to turn the release member 26 clockwise on its pivot, to hold it in the position illustrated, latching the master member in its tensioned position. When radially inward finger pressure is applied to the external end 26c of the release member, the member is swung counterclockwise, thus removing the end 26a thereof from the latching shoulder 20a of the master member and allowing the master member to start its counterclockwise rotation under the influence of the master spring 24.

A fixed pivot pin 36 in the housing serves as the mounting for a bellcrank lever 38, urged in a counterclockwise direction by a light spring 34. When the bellcrank lever is in its extreme counterclockwise position as illustrated in the drawings, one end 38a lies in a notch in the master member 20, and limits the counterclockwise rotation of the master member to a fraction of its full range, stopping the master member when a shoulder 20c thereon engages the end 38a of the bellcrank 38. At this position of the master member, the shutter blades are fully open. The master member cannot continue its counterclockwise rotation to close the shutter blades, until the end 38a of the bellcrank is removed from the path of the shoulder 20c.

The bellcrank is latched in its counterclockwise or obstructing position, by a latch 40 mounted on a pivot pin 40a and urged by a light spring 42 against a stationary stop pin 44. This latch member 40 is the armature of an electromagnet 46, and is attracted to the pole piece 46a of the electromagnet, when the magnet is energized. When the armature is thus attracted, it no longer blocks the bellcrank 38, and the cooperation of the surface 20c of the master member with the end 38a of the bellcrank can swing the bellcrank in a clockwise direction against its light spring 34, allowing the master member to complete its running down movement and close the shutter blades.

In the shutter housing or casing there are two electric switches. The first of these has two contact members 51 and 53, forming a normally open switch. The member 51 is pressed against the member 53 to close the switch, when the release member 26c is pressed inwardly to release the master member to start the exposure cycle. This closing of the switch 51, 53 turns on the electronic control device further described below, that is connects it to the source of current.

The other switch is formed by two contact springs 57, 59 which, in the rest or run down position of the shutter, are held in contact with each other by a pin 16b on an arm of the blade operating ring 16. Shortly after the start of the opening movement of the shutter, the pin 16b moves away from the end of the spring contact member 57 and the resilance of this member then moves it away from the contact member 59, opening the switch. The purpose of this switch is to short circuit the electronic control device to provide a uniform starting condition or status of the device when the cycle begins, as further explained below.

The above mentioned electromagnet 46 is connected to and controlled by an electronic time control device, the wiring diagram of which is shown in FIG. 2. As customary, the shutter has a shutter speed setting or exposure time setting ring 48, usually mounted at the front of the shutter and rotatable about the optical axis as a center. This ring carries a shutter speed scale 48s graduated in the usual intervals as illustrated, which are read in conjunction with an index mark or reference point indicated schematically at 55. Customarily the time scale is graduated logarithmically; that is, successive graduations are at uniform distance intervals from each other, but the values of the graduations are logarithmic, the values of the graduations usually being successive powers of the numeral 2, somewhat rounded off if desired. For example, the next graduation after 64 should theoretically be 128 but is customarily rounded off to 125.

Associated with the time or speed scale 48s is an electrical resistor 50 having linear characteristics. That is, a given distance along the resistor represents a change in resistance proportional to the distance, rather than a logarithmic change. The resistor (in effect, a potentiometer) cooperates with a wiper or slider 52, whose position on the resistor determines the resistance characteristics of the appropriate part of the circuit. The resistor can be stationary and the wiper 52 can be mounted on the speed setting ring 48 to move therewith along the resistor. However, the reverse arrangement is preferred and is here illustrated, the wiper 52 being stationary and the resistor 50 being mounted on and movable bodily with the speed setting ring 48. The resistor is connected by the conductors 50a and 50b to an appropriate source of current (not shown) such as a battery. When the resistor is mounted on the speed setting ring 48, the setting ring is advantageously made of plastic material in order to obtain suitable electrical insulation between the resistor and the setting ring. The elements 50 and 52 together form a linear potentiometer which can be adjusted as desired, by turning the shutter speed setting ring 48.

The wiper or slider 52 of the potentiometer is connected with the input of a logarithmizer 56. The linearly varying input voltage which is controlled through the potentiometer is converted by means of this logarithmizer into a logarithmic function so that a logarithmic course of voltage is obtained at the output 56a of this logarithmizer. The output 56a is connected by the previously mentioned connecting switch 51, 53 with the electronic control device which establishes the exposure time or shutter speed.

This control device comprises an operational amplifier 58 connected as an integrator, and an RC member having a resistor 60 and capacitor 62, and a threshold switch 64, and the above mentioned electromagnet 46, these elements being connected together in the manner shown in FIG. 2. The short circuit switch 57, 59, together with the resistors 66 and 68, are associated with the capacitor 62, as illustrated in FIG. 2. As already briefly mentioned, the fact that the switch 57, 59 is closed when the shutter is in the rest position insures that the capacitor 62 of the RC member is fully discharged at the end of each cycle of operation, so that each cycle starts from a zero charge on this capacitor 62.

The threshold switch 64 is of conventional known type, for instance, a transistorized toggle switch which serves to place the electromagnet 46 in operation at a given threshold voltage after the passage of a period of time which is determined by the RC member and its input voltage. The logarithmizer 56 and the amplifier 58 are also conventional components known in the art, the details of which are not important for purposes of the present invention.

The operation is as follows:

Assuming that the parts are in the run down position (at the end of an exposure cycle) the shaft 20b of the master member 20 is turned clockwise, thereby tensioning the main or master spring 24. During this movement, the coupler link 22 slides past the lug 16a on the blade ring 16 without actuating it. In the fully tensioned or cocked position, the end surface 26a of the release member 26 snaps behind the mating surface 20a of the master member. At the same time the armature 40 of the electromagnet 46 also snaps into position behind the arm 38c of the bellcrank lever 38.

Let us assume that a photograph with an exposure of 1/64 of a second is to be taken. The desired exposure time is set on the setting ring 48 by placing the scale value 1/64 of the scale 48s opposite the index mark 55. In this way, by means of the wiper 52, the resistance of the effective part of the resistor 50 is correspondingly adjusted, as indicated in FIG. 2.

Thereupon the shutter can be released by pressing on the release lever or trigger 26. This immediately closes the switch 51, 53 during the initial phase of this release movement, and the electronic control device is thus provided with current. As soon as the release lever or trigger 26 is pressed further inward, the end 26a thereof is moved away from the shoulder 20a of the master member, so that the master member can now run down freely in a counterclockwise direction, moving the blade ring 16 counterclockwise by means of the coupler link 22, and the blades 10 are opened. After a short starting movement of the blade ring 16, the pin 16b thereon releases the pressure on the contact spring 57 so that the short circuit switch 57, 59 is opened. The charging of the time-determining capacitor 62 which is associated with the integrator 58 can now begin.

In the open position of the shutter blades, the mating surface 20c on the master member 20 strikes the surface 38a on the bellcrank lever 38, so that further running down movement the master member 20 is prevented as long as the armature 40 blocks the bellcrank lever 38. After a period of time determined by the RC member and its input voltage, the charge voltage of the capacitor 62 reaches the threshold voltage of the threshold switch 64, which now results in energizing the electromagnet 46. The electromagnet attracts the armature 40, whereby the bellcrank lever 38 is released. Under the pressure of the master spring 24, the bellcrank lever 38 is pushed away in a clockwise direction by the slightly inclined or camming surface 20c, and the master member 20 is thus released to resume its counterclockwise running down movement. During the second phase of the running down movement, the blade ring 16 is moved in a clockwise direction by the action of the coupler link 22, and the blades 10 which have previously been opened are thereby again closed, completing the exposure.

It is clear that in each case there flows over the linear resistor 50 and the following logarithmizer 56 of the electronic control device, a voltage whose value is adapted to the logarithmic graduation of the time setting scale 48s. Therefore, in other words, the resistance at the resistor 50 upon the displacement of the setting device 48 by one scale value will increase or decrease only linearly, i.e., by the same value in all cases, but the voltage value introduced into the control device via the logarithmizer 56 will thereby be changed logarithmically, being either doubled or halved for a change of one graduation of the scale 48s. Since the linearity of the resistor 50 within wide limits can be obtained without difficulty, and the known logarithmizer component parts also assure precision of operation in ranges sufficient for the present purpose of control (which may cover several powers of ten) an arrangement of low cost and great dependability is obtained by the use of the present invention.

As already indicated, the invention may be applied to other types of shutters, including focal plane or curtain shutters, and may be applied to other factors than shutter speed, as for example the setting of a diaphragm aperture.

What is claimed is:

1. An electronic control device for an exposure factor of a photographic camera, comprising:
   a. a logarithmically graduated setting scale;
   b. an electrically operated control element for controlling an exposure factor in response to a value set on said setting scale;
   c. a potentiometer having a variable resistance value settable by setting said graduated setting scale, said potentiometer having a resistance values varying linearly; and
   d. a logarithmizer having an input responsive to the set resistance value of said potentiometer and having an output operatively connected to said control element.

2. The invention defined in claim 1, wherein the exposure factor to be controlled is the exposure time of a photographic shutter, further comprising an operational amplifier (58) serving as an integrator and having an input operatively connected to the output of said logarithmizer (56), an RC member (60, 62) operatively associated with said amplifier, means (51, 53, 26) for rendering said RC member operative substantially at the beginning of an exposure cycle of said shutter, a threshold switch (64) having an input responsive to an output of said operational amplifier (58) and having an output operatively connected to said control element (46), said control element when operated serving to initiate a shutter closing portion of an exposure cycle of said shutter, said threshold switch being effective to operate said control element at a variable time after the beginning of said exposure cycle, said variable time being responsive to said RC member and the input voltage thereof as derived from said potentiometer through said logarithmizer.

3. The invention defined in claim 2, wherein said means (51, 53, 26) for rendering said RC member operative is a switch (51, 53) operatively interposed between said logarithmizer (56) and said integrator (58), and wherein said shutter has a release member (26) operable to initiate an exposure cycle of the shutter, operation of said release member serving to close said switch (51, 53).

4. The invention defined in claim 2, further comprising a short circuit switch (57, 59) serving, when closed, to short circuit a portion of said RC member (60, 62), and means (16b) for opening said short circuit switch upon initial opening movement of said shutter.

5. The invention defined in claim 1, wherein the exposure factor to be controlled is the exposure time of a photographic shutter.

* * * * *